United States Patent [19]
Wastenson et al.

[11] 3,913,707
[45] Oct. 21, 1975

[54] SHOCK ABSORBING DEVICE

[75] Inventors: Erik Goran Wastenson, Viken; Gote Allan Carlsson, Hoganas, both of Sweden

[73] Assignee: Hoganas Aktiebolag, Hoganas, Sweden

[22] Filed: Aug. 16, 1974

[21] Appl. No.: 498,024

[30] Foreign Application Priority Data
Aug. 22, 1973 Sweden.............................. 7311391

[52] U.S. Cl...................... 188/1 C; 74/492; 293/70
[51] Int. Cl.².............................................. F16F 7/12
[58] Field of Search .......... 74/492; 188/1 C; 293/70

[56] References Cited
UNITED STATES PATENTS

| | | | |
|---|---|---|---|
| 3,380,557 | 4/1968 | Peterson ............................ | 188/1 C |
| 3,583,530 | 6/1971 | DeVenne ............................ | 188/1 C |
| 3,721,320 | 3/1973 | Hirsch ............................... | 188/1 C |
| 3,744,338 | 7/1973 | Komatsu et al. ..................... | 188/1 C |
| 3,797,872 | 3/1974 | Watanabe et al. ................ | 293/70 X |
| 3,833,093 | 9/1974 | Robinson ............................ | 188/1 C |

FOREIGN PATENTS OR APPLICATIONS

1,280,548 11/1961 France ............................... 188/1 C

*Primary Examiner*—Duane A. Reger
*Attorney, Agent, or Firm*—Toren, McGeady and Stanger

[57] ABSTRACT

A shock absorbing device contains an energy absorbing member in the form of a porous metal body. A piston having a widening portion is arranged to be driven into the porous metal body. The widening portion of the piston compacts the porous metal in a direction transverse to the direction of movement of the piston. The retardation of the piston remains substantially constant during the travel of the piston through the porous metal body.

2 Claims, 5 Drawing Figures

SHOCK ABSORBING DEVICE

FIELD OF THE INVENTION

The present invention is directed to a shock absorbing device, and particularly a device for absorbing a large amount of energy. It is a particular object of the invention to provide a shock absorbing device which is useful in automobiles and other vehicles for reducing the harmful effect of a collision upon the passengers.

BACKGROUND INFORMATION

Shock absorbing devices in automobiles have come to be of current interest in connection with the new recommendations in the safety motor vehicle field given by both American and European authorities. As an example an American car produced later than 1973 is expected to be able to withstand a collision at the velocity of 5 mph (8 km/h) without any extensive damages. This critical velocity will probably be raised to 10 mph (16 km/h) for cars produced later than 1975. As a guide line for the future safety motor vehicle the National Highway Traffic Safety Administration (NATSA) in the U.S. has stated that passengers and drivers of the future car shall not be injured by a head-on collision at the velocity of 50 mph (80 kg/h).

The following demands are made upon a shock absorbing system: (1) The energy of motion is to be absorbed in the shortest possible retardation length without the retardation being higher than a certain amount, for example the maximal retardation which can be tolerated by the human body. (2) The energy of motion is to be absorbed by the shock absorbing system as far as possible, in order not to push back the vehicle after the collision, and in order to leave other parts of the automobile intact. (3) Low production costs.

The principal parts of most shock absorbing devices are a movable energy transferring part, hereinafter called piston, and a fixed part containing a material which absorbs energy when compressed by the piston. In order to fulfill the first demand presented above, the retardation ought to be constant along the whole retardation length. This claim makes it impossible to construct a simple shock absorbing device in which the energy absorbing material is deformed in the same direction as the piston moves. In that case it would be impossible to get a constant retardation. This invention is founded on the idea that the piston when forced into the energy absorbing material shall deform the energy absorbing material in a direction perpendicular to the motion of the piston.

SUMMARY OF THE INVENTION

The shock absorbing device according to this invention comprises an energy absorbing member consisting of a porous metal body, and a conical or wedge-shaped piston arranged to deform the porous metal body in a direction perpendicular to the direction of motion of the piston when forced into the energy absorption member. The porous metal body should preferably consist of sintered iron or steel powder. For example, sponge iron may be ground into a powder, which is moulded into the desired shape and sintered at a temperature of approximately 1,100° C. If the powder is moulded without being compacted the sintered body will have a density of 1.8–3.0 g/cm³. If the powder is compacted when being moulded the density of the sintered body may be increased to 3.0–6.0 g/cm³.

An embodiment of the invention which is useful as a shock absorbing device for a vehicle comprises a housing, means for fastening the housing to a first part of the vehicle, in the housing an energy absorbing member consisting of a porous metal body, a piston, means for fastening one end of the piston to a second part of the vehicle, the other end of said piston extending into the housing, the other end of the piston having a widening portion in contact with the energy absorbing member so as to compact said energy absorbing member laterally when the piston is forced into the housing as said two parts of the vehicle approach each other upon a collision.

A second embodiment which is useful as a shock absorbing device for a vehicle comprises a housing, means for fastening said housing to a first part of the vehicle, in the housing an energy absorbing member consisting of a porous metal body, a piston, means for fastening one end of said piston to a second part of the vehicle, the other end of said piston extending into the housing, the other end of the piston having a cross-sectional area considerably smaller than that of the housing so as to be able to pierce the energy absorbing member when the piston is forced into the housing as the two parts of the vehicle approach each other upon a collision, the other end of the piston having a widening portion to compact the energy absorbing member laterally while piercing the energy absorbing member.

A third embodiment which is useful as a shock abosrbing device for a vehicle comprises a housing, means for fastening the housing to a first part of the vehicle, in the housing an energy absorbing member consisting of a porous metal body, an opening extending lengthwise into the energy absorbing member, a piston, means for fastening one end of said piston extending into said housing, the other end of the piston having a first or leading end portion fitting into the lengthwise opening of the energy absorbing member, a second portion trailing the leading end portion and having a cross-sectional area greater than that of the lengthwise opening but smaller than that of the energy absorbing member, and a third widening portion between the first and second portions, said third widening portion compacting the energy absorbing member laterally when forced to penetrate the energy absorbing member as the first and second parts of the vehicle approach each other upon a collision.

BRIEF DESCRIPTION OF THE DRAWINGS

The invention will now be described with reference to the drawings.

DETAILED DESCRIPTION OF THE PREFERRED EMBODIMENTS

Figure 1:
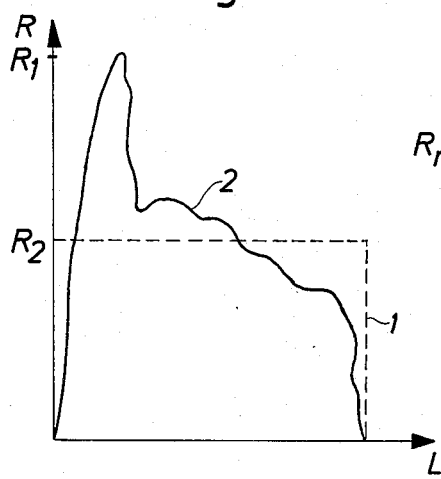
FIGS. 1 and 2 illustrate the retardation R as a function of the retardation length L.

FIG. 1 shows a comparison between the ideal energy absorption, line 1, with constant retardation ($R_2$) and a practical case, line 2, with the same amount of energy absorbed during the same retardation length. The areas defined by the two lines and the coordinate axes are equal in size, and the size of the area is a measure of the energy absorbed by the system. As can be seen in the figure a very high maximal retardation $R_1$ is obtained in the practical case as compared with the constant retardation $R_2$ in the ideal case. The retardation defined by line 1 is more tolerable to a passenger in a colliding car than is the retardation defined by line 2.

Figure 2:
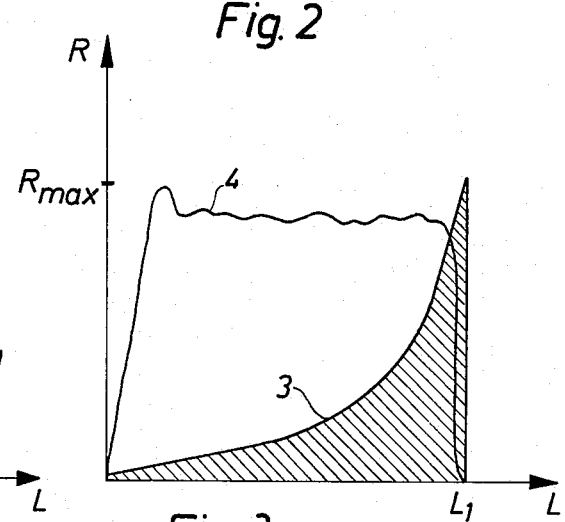

FIG. 2 shows the absorbed energy when compacting a porous metallic material in the direction of the impact, line 3, and in the direction perpendicular to this impact, line 4, both having the same maximum retardation, $R_{max}$, and the same retardation length $L_1$. The hatched area defined by line 3 is a measure of the energy absorbed by the compaction in the direction of the piston movement, the retardation being limited to $R_{max}$ at the most. The area defined by the line 4 and the L-axis illustrates the energy absorbed by compaction perpendicular to the direction of the piston movement, if the highest permitted retardation is $R_{max}$. The amount of energy absorbed in this case is, as can be seen from the figure, considerably higher than in the case when the compaction is performed in the direction of the piston movement. The energy absorption curve 4 is very similar to the ideal curve 1 in FIG. 1.

Figure 3:
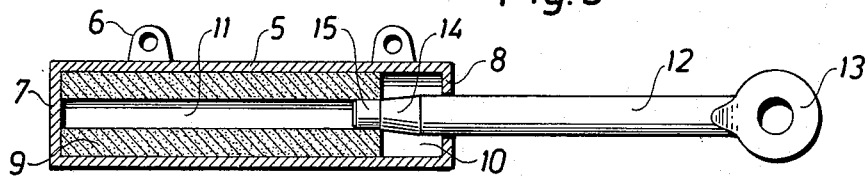
FIG. 3 illustrates an embodiment of the invention to be used in an automobile.
Figure 4:
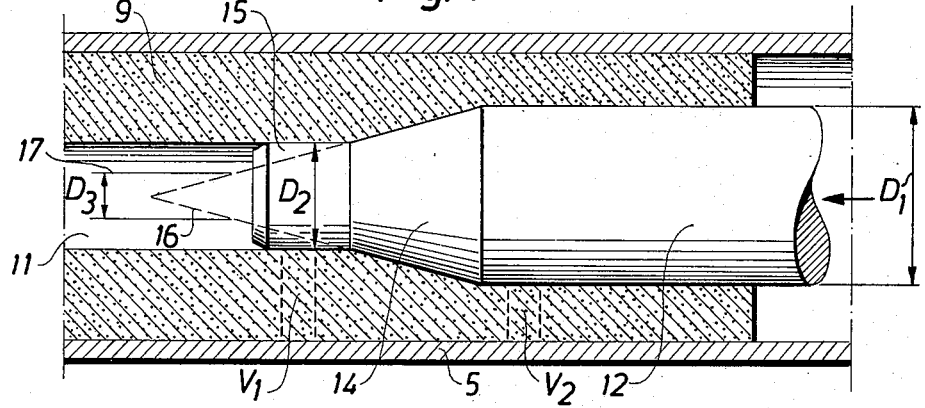
FIG. 4 illustrates a portion of FIG. 3 on a larger scale.

A shock absorbing device useful for an automobile is illustrated in FIGS. 3 and 4. The device comprises a tubular housing 5 having members 6 for fastening it to the frame of an automobile. One end of the tubular housing is closed by an end wall 7, and the other end of the housing has an end wall 8 with a central opening. The housing 5 contains a porous metal body 9 which fills the container in the axial direction except for an empty space 10 adjacent to the end wall 8. The porous metal body 9 contains a cylindrical opening 11 extending throughout the length of the body. A rod or piston 12 has in one end a member 13 for fastening it to the bumper of the automobile. The other end of the piston extends into the space 10 of the housing 5 and has a frusto-conical portion 14 narrowing from the diameter $D_1$ to the diameter $D_2$, note FIG. 4. The extreme end 15 of the piston has the diameter $D_2$ and fits into the opening 11 of the porous metal body 9.

Upon a collision the bumper of the automobile will force the piston 12 into the porous metal body 9. The conical portion 14 will compact the porous metal in a transverse direction, meaning that an element having the volume $V_1$ will be compressed to the volume $V_2$, see FIG. 4. A continuous deformation of the porous metal will take place during the travel of the conical portion 14 through the porous metal body 9, resulting in a retardation of the type illustrated by the line 4 in FIG. 2. The extreme end portion 15 will serve as a guide tap. Alternatively, the guide tap 15 may be shaped as a cone, for example as indicated by the dotted lines 16 in FIG. 4. In this case the diameter of the opening 11 may be reduced, for example as illustrated by the dotted lines 17 in FIG. 4 illustrating a guide opening having the diameter $D_3$.

Figure 5:
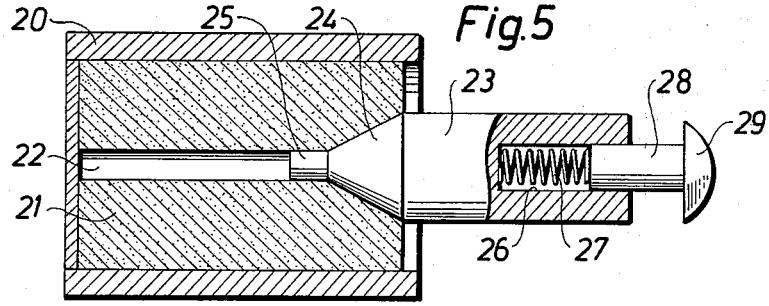
FIG. 5 illustrates another embodiment to be used in an automobile.

The porous metal body is destroyed upon a collision, and has to be replaced. Therefore, it is desired that the porous body shall not be deformed if the car collides at a very low velocity. Therefore, the shock absorbing device of the invention is preferably combined with a conventional shock absorber which responds to low velocity collisions in an elastic way. Such a conventional shock absorber may contain a spring member, or it may be of pneumatic or hydraulic type. FIG. 5 illustrates such a combined shock absorbing device. It comprises a housing 20 containing a porous metal body 21 having a control opening 22, and a piston 23 having a frustoconical portion 24 and a guide tap 25, all these parts being more or less similar to those described with reference to FIGS. 3 and 4. The outer end of the piston 23 is provided with an opening or blind bore 26 which contains a spring member 27. A rod 28 has one end extending into the opening 26, the other end being provided with means 29 for fastening it to the bumper of an automobile. The force produced upon a minor collision will be absorbed in an elastic way by the spring member 27. A collision at a higher velocity will first compress the spring member 27, and subsequently the piston 23 will start moving into the housing 20, deforming the porous metal body in the way described above.

It will be understood from the description of FIGS. 3 and 4 that the degree of deformation of the porous metal body 9 can easily be controlled, either by varying the diameter $D_1$ relative to that of the porous metal body 9, or by varying the ratio of $D_1$ to $D_2$. It is desired that the porous metal body has a porosity, after having been compacted by the piston, of at least 5 percent by volume, and preferably more than 10 percent by volume. The porosity before the compaction is preferably 25–75 percent by volume.

The devices described above contain one single body of porous metal. It is within the scope of the invention to provide a housing containing two or more porous metal bodies. The bodies may, for example, have the form of two plates separated by a narrow space acting as a guide opening. The piston may be wedgeshaped, and the edge of the wedge may serve as a guide tap engaging the guide opening.

EXAMPLE 1

A shock absorbing device as illustrated in FIGS. 3 and 4 contained a porous iron body which had been sintered at 1,120° C for 1 hour to a density of 2 g/cm³. The diameter of the porous iron body was 60 mm. The diameter of the central opening serving as guide track was 4 mm. The diameter $D_1$ was 15 mm, and the diameter $D_2$ was 4 mm. The length of the frustoconical portion 14 was 5.5 mm, meaning that the conical surface made an angle of 45° to the direction of movement. It was found that a force of 12.8 kN (kilonewton) was required for pressing the piston through the porous iron body at a constant velocity, and the force remained constant during the whole travel of the piston through the porous iron body.

EXAMPLE 2

The device used in Example 1 contained a porous iron body which had been compacted and sintered to a density of 4 g/cm³. It was found that a constant force of 158 kN was required for pressing the piston through the porous iron body. Obviously the retardation effect of the device can be varied within wide limits by varying the density of the porous metal body.

In Examples 1 and 2 a lubricant had been applied on the piston. The retardation force increases if the lubricant is omitted, but the ideal form of the retardation curve is retained.

EXAMPLE 3

Three shock absorbing devices of the type referred to in Example 2 were mounted between the front bumper and the frame of an automobile weighing 1,200 kg.

Each device had a retarding force of 158 kN, and consequently the assembly had a retarding force of 474 kN. This retarding force results in a retardation of 40 g upon a collision, which is the highest retardation tolerable to man. If the car collides at a velocity of 80 km/h it has a kinetic energy of 296 kJ (kilojoule). If the shock absorbers shall be able to absorb the entire kinetic energy they must have a length of 296 : 474 = 0.63 m.

What is claimed is:

1. A shock absorbing device for a vehicle comprising a housing, means for fastening said housing to a first part of the vehicle, an energy absorbing member positioned in said housing and comprising a porous metal body having a central opening extending therethrough, said porous metal body is capable of being compacted, an axially extending piston having a first end and a second end spaced apart in the axial direction thereof, means for fastening the second end of said piston to a second part of the vehicle, the first end of said piston positioned within said housing and having a first portion extending from the first end and positioned within said central opening of said porous metal body in closely fitting contact therewith, a second portion of said piston located closer to the second end thereof having a cross-sectional area greater than that of the first portion but less than that of said porous metal body, and a third portion located between said first and second portions and having tapering surfaces diverging in the direction toward the second end of said piston, said third portion arranged to compact said porous metal body in the direction transverse to the axial direction of the piston when the piston is forced to penetrate into the porous metal body as said first and second parts of the vehicle move toward one another during a collision, said porous metal body positioned within said housing having one end thereof remote from the piston abutting an end of said housing so as to prevent the axial movement of said porous metal body.

2. A shock absorbing device according to claim 1, wherein said piston comprises a central opening starting from said second end and extending partially into the interior of said piston, said piston having a spring mounted in said central opening, a rod having one end connected to the end of the spring near said second end, and said means for fastening the second end comprises fastening means connected to said rod at the end remote from that connected to said spring, whereby said shock absorber is prevented from being operated for low velocities of the vehicle, and operated only upon collisions involving high speeds.

* * * * *